United States Patent [11] 3,611,323

[72] Inventors Tadahiro Goto; Kazuhiko Kakuta, both of Tokyo-to, Japan
[21] Appl. No. 827,002
[22] Filed May 22, 1969
[45] Patented Oct. 5, 1971
[73] Assignee Iwasaki Tsushinki Kabushiki Kaisha (also known as Iwatsu Electric Co. Ltd.) Tokyo-to, Japan
[32] Priority May 27, 1968, Dec. 26, 1968
[33] Japan
[31] 43/35,932 and 43/94,999

[54] MAGNETOSTRICTIVE DELAY-LINE MEMORY
3 Claims, 7 Drawing Figs.

[52] U.S. Cl. ........ 340/173 MS, 340/174 MS, 333/30 M
[51] Int. Cl. ........ G11c 21/02
[50] Field of Search ........ 340/174 MS, 173 MS, 173 RC; 333/30 M; 307/290

[56] References Cited
UNITED STATES PATENTS
3,478,331 9/1969 Gratian ........ 340/173
3,492,667 1/1970 Gratian ........ 340/174
OTHER REFERENCES
Publication I. Convention on Digital Computer Techniques- — " Wire-Type Acoustic Delay Lines for Digital Storage" by G. G. Scarrott & R. Naylor Paper No. 2027 M; Mar. 1956; pgs. 497- 508

*Primary Examiner*—James W. Moffitt
*Attorneys*—Robert E. Burns and Emmanuel J. Lobato

ABSTRACT: A delay-line memory using a magnetostrictive delay-line, in which a pair of bidirectional pulses derived from the delay-line by the use of a magnetostrictive-electric transducer and having successive reverse polarities with respect to the successive polarities of a preceding bidirectional pulse are converted into a square wave output signal by a bistable circuit performing hysteresis switching action triggered at times when the instantaneous level of the bidirectional pulses exceeds a first reference level determined between the zero level and the plus peak level of the bidirectional pulses and descends a second reference level determined between the zero level and the minus peak level of the bidirectional pulses.

MAGNETOSTRICTIVE DELAY-LINE MEMORY

This invention relates to a magnetostrictive delay-line memory comprising a magnetostrictive delay-line and means for regenerating and reinserting digital information into the delay-line.

In a case where a rectangular pulse is applied to a mangetostrictive delay-line, bidirectional pulses derived from a transducer coupled with the delay-line are delayed, by a delay time $t$, respectively from the rise instant and the termination instant of the inserted rectangular pulse. In one conventional delay-line memory of this type (e.g.; Japan Pat. Publication No. 8254/1964), the bidirectional pulses are applied to two level detectors respectively having a plus reference level and a minus reference level, so that plus pulses are obtained from one of the two detectors with respect to the plus reference level in synchronism with the instants when the instantaneous levels of the bidirectional pulses reach the plus reference level, and so that minus pulses are obtained from the other of the two detectors with respect to the minus reference level in synchronism with the instants when the instantaneous levels of the bidirectional pulses reach the minus reference level. Accordingly, the rectangular pulse inserted in the delay-line can be regenerated, delayed by a delay time $t$, by setting the state of a bistable circuit to the state "1" in synchronism with the former one of the plus pulses and by resetting the state of the bistable circuit to the state "0" in synchronism with the later one of the two minus pulses. However, this conventional circuitry of the conventional regeneration technique for delayed pulses is complicated.

An object of this invention s to provide a delay-line memory reliably regenerating delayed pulses by regeneration means of simple construction.

In accordance with the characteristic feature of this invention, the regeneration means of the delay-line in provided with a bistable trigger circuit, such as Schmitt trigger, that converts a pair of bidirectional pulses which are successively derived from the delay-line and have successive reverse polarities with respect to the successive polarities of a preceding bidirectional pulse into a square-wave output signal by a hysteresis switch action triggered at a time when the instantaneous level of the input voltage of this bistable trigger circuit exceeds a predetermined first reference level or descends below a predetermined second reference level. In other words, delayed pulses can be readily regenerated with simple construction by utilizing the hysteresis switching action of the bistable trigger circuit.

The principle of this invention will be better understood from the following more detailed discussion taken in conjunction with the accompanying drawings, in which.

Figure 1:
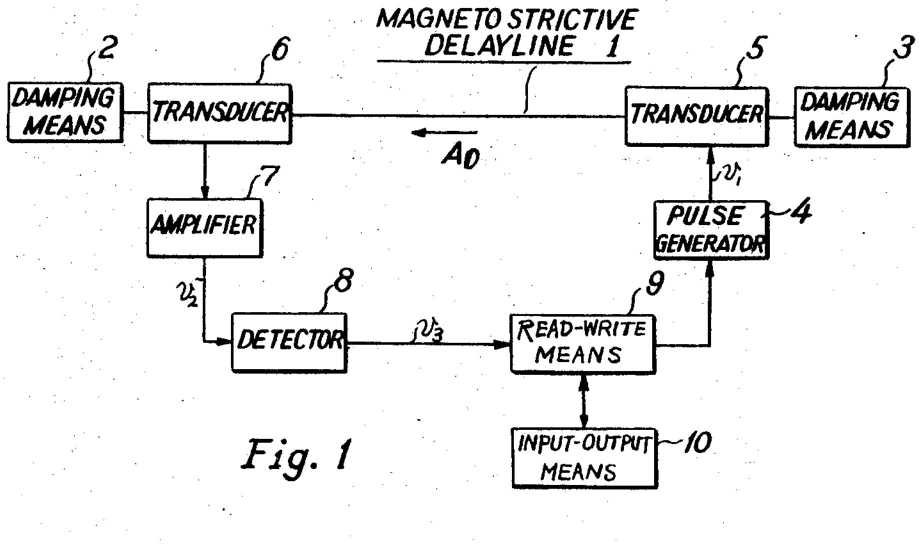
FIG. 1 is a block diagram for illustrating an embodiment of this invention.

With reference to FIG. 1, an example of this invention comprises a magnetostrictive delay-line 1, damping means 2 and 3 arranged respectively the ends of the delay-line 1 to damp reflected waves from the delay-line 1, a pulse generator 4 generating pulses to apply the delay-line 1, an electromagnetostriction transducer 5 (e.g.; a coil arranged concentrically with the delay-line 1) to apply an ultrasonic shock wave in response to the pulse generated from the pulse generator 4 to the delay-line 1, a magnetostriction-electric transducer 6 to pick up, as an electric signal, the shock wave travelling through the delay-line 1 in the direction of an arrow $A_0$, and amplifier 7 amplifying the electric signal picked up, a detector 8 for detecting desired pulses from the amplified electric signal, an input-output means 10 to take out readout pulses and to receive input pulses, and a read-write means 9 for reading out the detected pulses to apply the input-output means 10 and for controlling the pulse generator 4 to write-in the input pulses or the readout pulses again in the delay-line 1.

Figure 2:
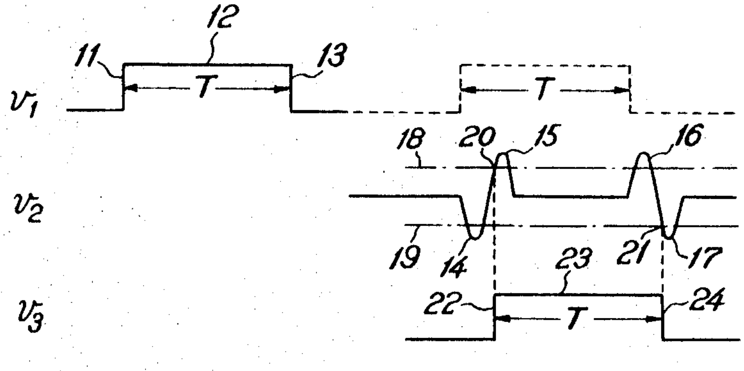
FIG. 2 shows time charts explanatory of the operation of the embodiment of this invention.

A square wave $v_1$ shown in FIG. 2 is an example of the square wave generated from the pulse generator 4 and having a rise portion 11, a flat portion 12 lasting a duration T and a termination portion 13. It can be considered that this square wave is delayed as shown by a dotted line through the delay-line 1 if it is assumed that this square wave travels through the delay-line 1 as it is. Accordingly, a pair of bidirectional pulses $v_2$ are obtained at the output of the amplifier 7. In this case, peak portions 14 and 15 are obtained in response to the rise portion of the square wave delayed, and peak portions 16 and 17 are obtained in response to the termination portion of the square wave delayed. It will be seen that the bidirectional pulse comprising peak portions 16, 17 has successive reverse polarities (i.e. plus and minus) with respect to the successive polarities (i.e. minus and plus) of the preceding bidirectional pulse comprising peak portions 14, 15. These bidirectional pulses ($v_2$) are applied to the detector 8. This detector 8 is a bistable trigger circuit, such as Schmitt trigger, that has a first reference level 18 between the zero level and the plus peak level (15, 16) and a second reference level 19 between the zero level and the minus peak level 14, 17 so that a pair of the bidirectional pulses $v_2$ are converted into a square wave $v_3$ by hysteresis switching action triggered at a time 20 when the instantaneous level of the bidirectional pulses $v_2$ exceeds the first reference level 18 and a time 21 when the instantaneous level of the bidirectional pulses $v_2$ descends the second reference level 19. This regenerated square wave $v_3$ has a rise portion 22, a flat portion 23 lasting a duration T and a termination portion 24 which correspond respectively to the rise portion 11, the flat portion 12 and the termination portion 13 of the square wave $v_1$. Accordingly, the regenerated square wave $v_3$ has the same duration T as that of the square wave $v_1$ and delayed by a delay-time $t$ from the square wave $v_1$. This regeneration of the delayed pulse $v_3$ can be performed without disturbance of noise since the bistable trigger circuit has a hysteresis switching action.

Figure 3:
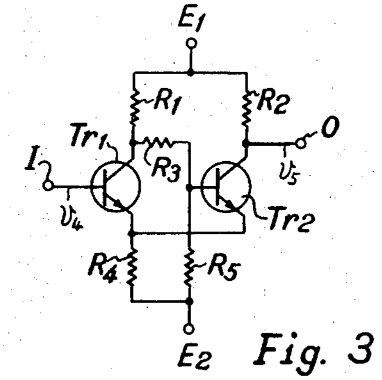
FIG. 3 is a circuit diagram for illustrating an example of the bistable trigger circuit used in the delay-line memory of this invention.
Figure 5A:
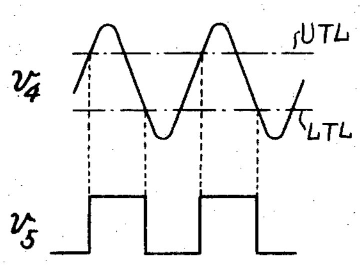
FIGS. 5A and 5B show time charts and a characteristic diagram explanatory of the operation of the example shown in FIG. 3.
Figure 5B:
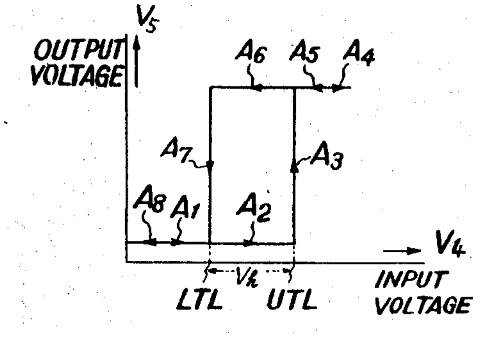

FIG. 3 shows an example of a Schmitt trigger using transistors $Tr_1$ and $Tr_2$ employed as the bistable trigger (detector 8). This Schmitt trigger has, as shown in FIG. 5A, usually a first reference level UTL and a second reference level LTL and converts an AC input signal $v_4$ applied to an input terminal I thereof into a square wave output signal $v_5$ by hysteresis switching action triggered at a time when the instantaneous level of the AC input signal $v_4$ exceeds the first reference level UTL or at a time when the instantaneous level of the AC input signal decends the second reference level LTL. In other words, the output voltage $v_5$ obtained at the output terminal O of the Schmitt trigger varies as shown by arrows $A_1$, $A_2$, $A_3$ and $A_4$ or arrows $A_5$, $A_6$, $A_7$ and $A_8$ respectively in FIG. 5B if the input voltage $v_4$ applied to the input terminal I increases or decreases Accordingly, this Schmitt trigger has a hysteresis characteristic indicated by a difference voltage $V_h$ between the two reference levels UTL and LTL.

Figure 4:
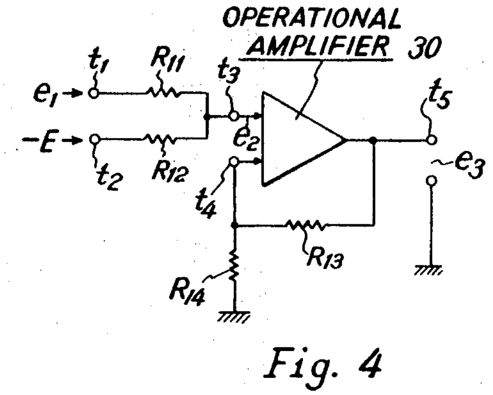
FIG. 4 is a circuit diagram for illustrating another example of the bistable trigger circuit used in the delay-line memory of this invention.

FIG. 4 shows another example of a bistable trigger circuit formed by use of a high-gain single-ended amplifier which has two differential inputs. One example of this single-ended amplifier is an operational amplifier 30, which has two differential input terminals $t_3$ and $t_4$ and an output terminal $t_5$. An input signal $e_1$ and a reference level $-E$ is applied to one ($t_3$) of the input terminals through respectively resistors $R_{11}$ and $R_{12}$, and an output voltage $e_3$ thereof is fed back through bleeder resistors $R_{13}$ and $R_{14}$ to the other ($t_4$) of the input terminals as the positive feedback signal so that the gain of the operational amplifier 30 is raised without oscillation. In this circuit, if the respective resistances $r_{11}$ and $r_{12}$ of the resistors $R_{11}$ and $B_{12}$ are equal to each other, a voltage $e_2$ appearing at the input terminal $t_3$ can be indicated as follows:

$$e_2=\frac{r_{12}}{r_{11}+r_{12}}(e_1-E)=\frac{1}{2}(E_1-E)$$

Figure 6:
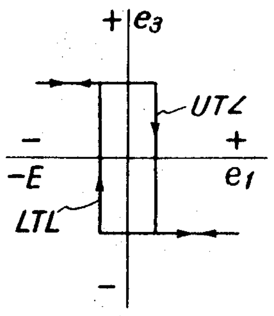
FIG. 6 shows a characteristic diagram explanatory of the operation of the example shown in FIG. 4.

The output voltage $e_3$ is limited in the negative region or in the positive region at a time when the level of the voltage $e_2$ reaches a first reference level UTL or a second reference level LTL as shown in FIG. 6. Accordingly, this circuit acting as an operational trigger can be employed as the detector 8 in this invention.

As mentioned above, a delayed pulse can be readily regenerated, by no use of a complicated circuitry, in accordance with the feature of this invention in which a bistable trigger circuit having a first reference level and a second reference level is employed to perform hysteresis triggering determined by the two reference levels. In this bistable trigger circuit, the two reference levels are determined so as to slice the bidirectional pulses $v_2$ at respective intermediate levels between the zero potential and the plus peak level of the bidirectional pulses $v_2$ and between the zero potential and the minus peak level of the bidirectional pulses $v_2$ as shown in FIG. 2.

What we claim is:

1. A delay-line memory comprising:

a magnetostrictive delay-line, insertion means coupled to the magnetostrictive delay-line for inserting a pair of shock waves into the magnetostrictive delay-line in response to each square pulse to be delayed, magnetostrictive-electric transducer means coupled with the magnetostrictive delay-line for producing a pair of bidirectional electric pulses, the latter of which has successive reverse polarities with respect to the successive polarities of the former bidirectional pulses, in response to said pair of shock waves travelling through the magnetostrictive delay-line, and a bistable trigger circuit which is connected in the output of said transducer means and which converts said pair of bidirectional pulses obtained at the output of the transducer means into a square wave output signal by hysteresis switching action triggered at times when the instantaneous level of the bidirectional pulses exceeds a first reference level determined between the zero level and the plus peak level of the bidirectional pulses and descends below a second reference level determined between the zero level and the minus peak level of the bidirectional pulses.

2. A delay-line memory according to claim 1, in which the bistable trigger circuit is a Schmitt amplifier.

3. A delay-line memory according to claim 1, in which the bistable circuit is an operational trigger.